Oct. 24, 1933.  C. KLOCK  1,932,315
LIFE PROTECTOR AND DUAL CONTROL FOR MOTOR VEHICLES
Filed Jan. 25, 1933  2 Sheets-Sheet 1
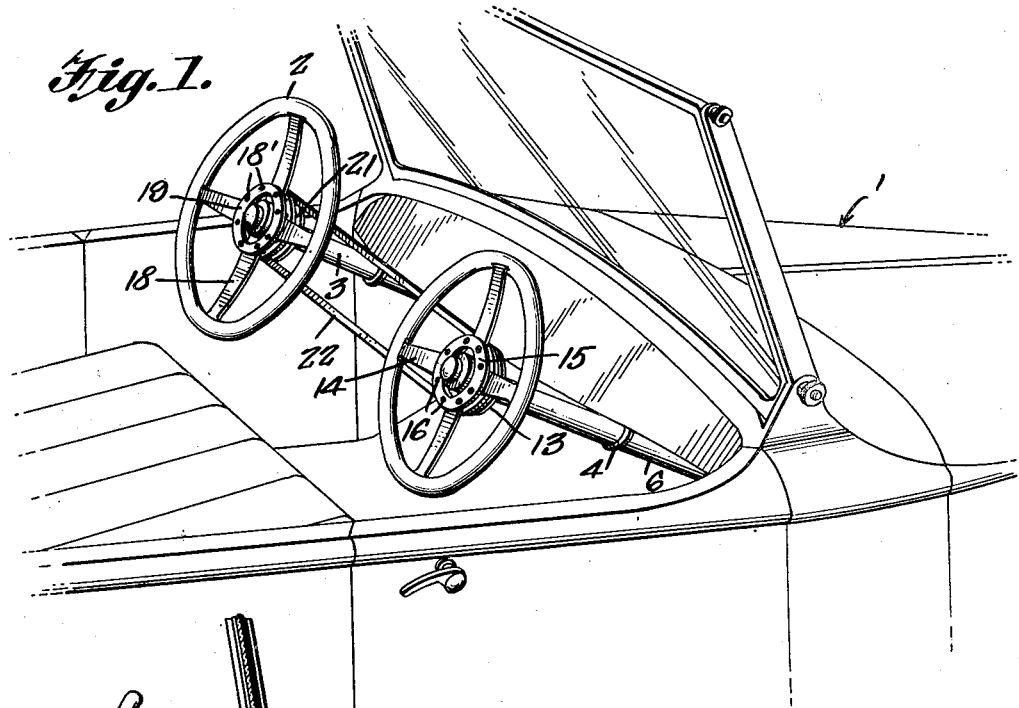
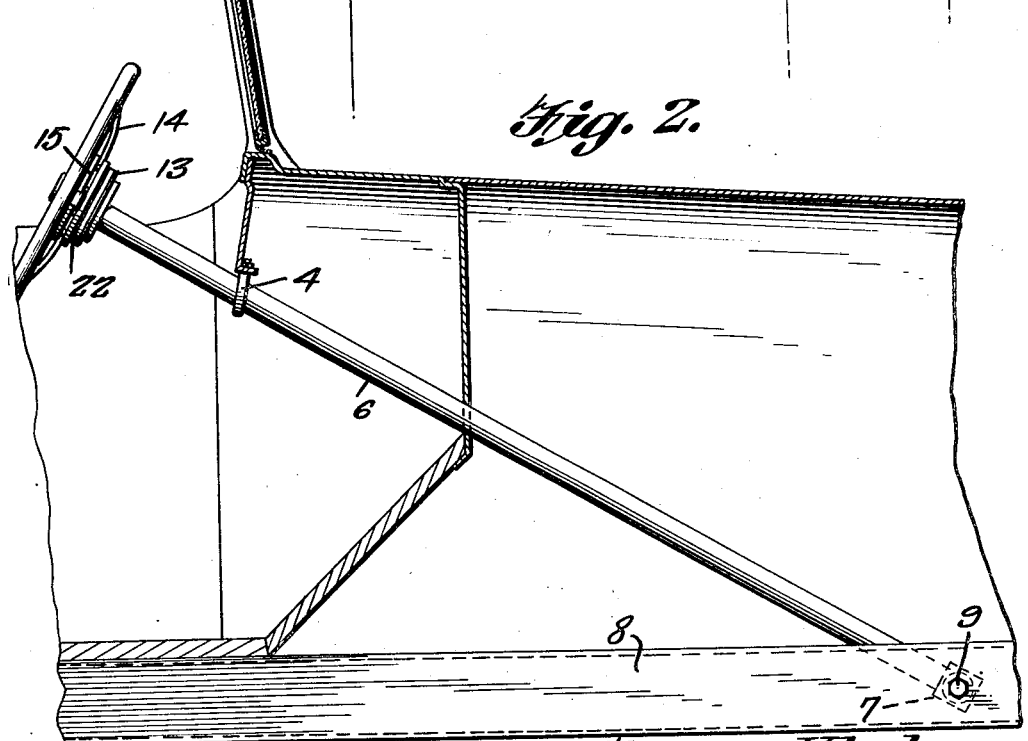
Clarence Klock, INVENTOR
BY Victor J. Evans & Co.
ATTORNEY Oct. 24, 1933.  C. KLOCK  1,932,315
LIFE PROTECTOR AND DUAL CONTROL FOR MOTOR VEHICLES
Filed Jan. 25, 1933    2 Sheets-Sheet 2
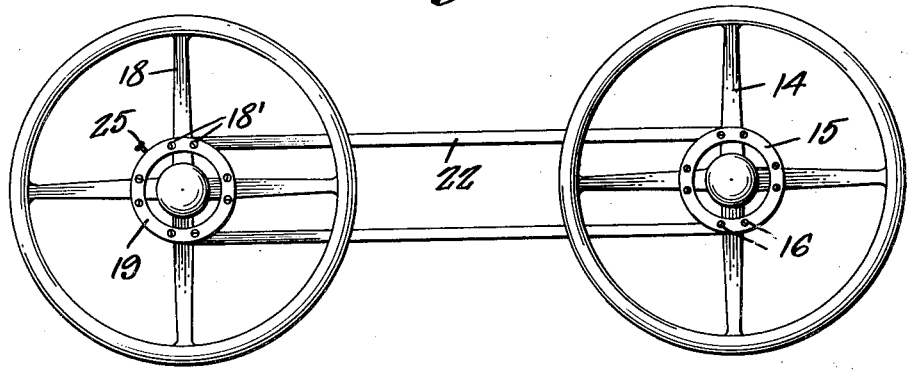
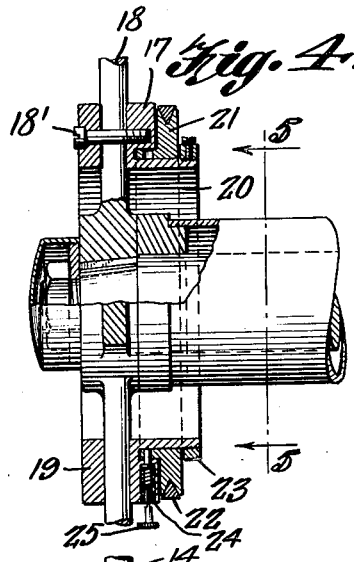
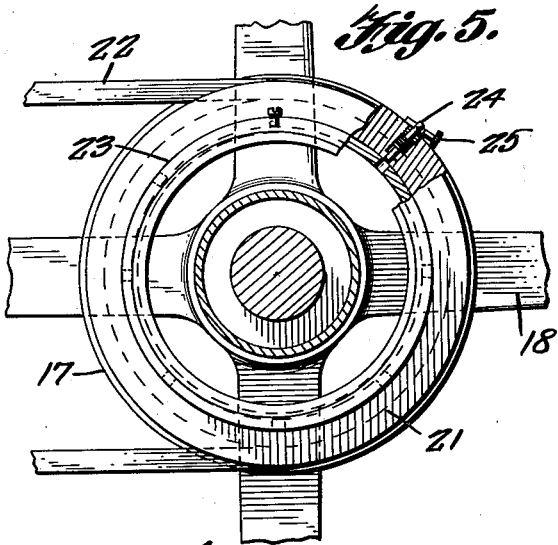
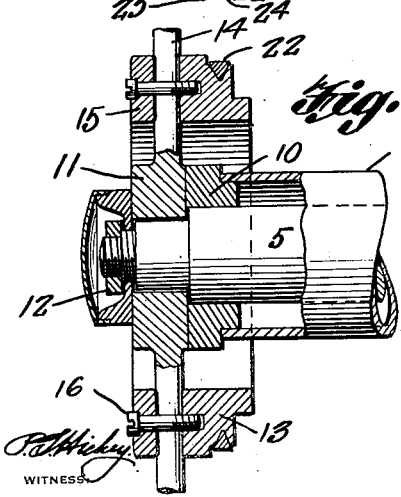
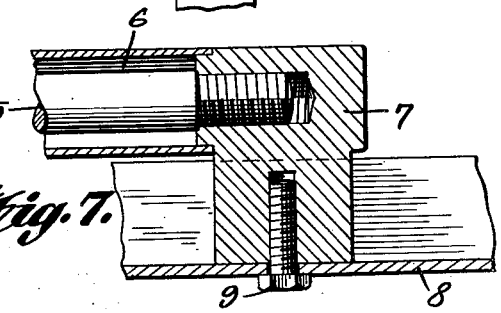
Clarence Klock, INVENTOR
BY Victor J. Evans & Co. ATTORNEY Patented Oct. 24, 1933

1,932,315

UNITED STATES PATENT OFFICE 1,932,315

LIFE PROTECTOR AND DUAL CONTROL FOR MOTOR VEHICLES

Clarence Klock, Dolgeville, N. Y.

Application January 25, 1933. Serial No. 653,499

1 Claim. (Cl. 74—39)

This invention relates to attachments for automobiles and other types of motor vehicles and has for the primary object, the provision of a device which may be easily and quckly installed to an automobile for the purpose of providing protection to the occupants seated at the non-driving side of the automobile by preventing the occupant from being thrown against the windshield or glass thereof during a collision or accident and also to provide a dual control whereby said occupant may at any time during the wish of the driver steer the automobile, relieving the driver of steering or may be employed for instructing a person to steer the automobile with the control of the automobile remaining in the hands of the driver.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary perspective view illustrating an automobile with an attachment applied thereto and constructed in accordance with my invention.

Figure 2 is a fragmentary vertical sectional view illustrating the same.

Figure 3 is a top plan view illustrating the combined protective and dual control device connected to the steering wheel of the automobile.

Figure 4 is a fragmentary sectional view illustrating the means of mounting a pulley to the steering wheel of the automobile and whereby said pulley may be locked to or released from the steering wheel.

Figure 5 is a sectional view taken on the line 5—5 of Figure 4.

Figure 6 is a fragmentary perspective view illustrating the auxiliary steering wheel and the pulley applied thereto.

Figure 7 is a detail view illustrating the means of connecting the auxiliary steering wheel post to the frame of the automobile.

Referring in detail to the drawings, the numeral 1 indicates an automobile having the conventional type of steering mechanism including the usual steering wheel 2 mounted on a steering post 3. The non-driving side of the automobile is equipped with a bracket 4 to support an auxiliary steering post 5 and housing 6 therefor. The lower end of the auxiliary steering post is threaded to a casting 7 secured to the frame 8 of the automobile by a stud bolt 9. The casting 7 also forms a support for the lower end of the housing 6. The upper end of the housing 6 is supported on the auxiliary steering post 5 by a bushing or nut 10. The upper end of the auxiliary steering post is reduced and has mounted thereon an auxiliary steering wheel 11. The steering wheel 11 is retained on the steering post 5 by nuts 12, one of which may be in the form of an ornamental cap. The auxiliary steering wheel 11 is preferably positioned the same distance from the instrument board and the seat of the automobile as that of the steering wheel 2 but on the non-driving side of the automobile.

A grooved pulley 13 surrounds the housing 6 at the upper end of the latter and abuts the spiders 14 of the auxiliary steering wheel. An annular member 15 is placed in engagement with the spiders 14 and carries stud bolts 16 threaded into recesses in the pulley 13 whereby the latter is locked for turning movement with the auxiliary steering wheel.

A drum 17 engages the spiders 18 of the main steering wheel 2 and is retained on the spiders 18 by an annular member 19 having stud bolts 18' threaded into the hub. The hub is provided with an annular flange 20 forming a seat to rotatably support a pulley 21 connected to the pulley 13 by an endless belt or chain 22. The pulley 21 is retained on the flange 20 by an annular member 23 threaded to said flange and also secured by set bolts. The hub 17 carries a spring pressed plunger 24 adapted to enter any one of a series of notches or sockets in the pulley 21 for locking the latter to the drum and consequently securing the pulley for rotation with the main steering wheel 2. The spring pressed plunger carries a pivoted finger piece 25 which may be disposed at an angle to the plunger for maintaining the latter in a retracted position or out of engagement with a notch or opening in the pulley 21.

The auxiliary steering wheel forms a protector for the occupants of the automobile seated on the non-driving side, the auxiliary steering wheel providing a medium for the occupant to grasp in case of an accident and consequently prevent the occupant from being thrown against or through the windshield. The driver when desiring to give the occupant control of the steering of the automobile, the plunger 24 is released locking the pulley 21 to the hub 17 of the main steering wheel whence the occupant may steer the automobile, relieving the driver of steering. Should the automobile become out of control by the occupant, the driver may through the main steering wheel assume immediate control of the automobile. Thus it will be seen that an effective means is provided for protecting the occupant sitting next to the driver of the automobile and also providing means whereby the occupant at the wish of the driver may assume control or steering of the automobile.

While I have shown and described the preferred embodiment of my invention, it will be understood that minor changes in construction, combination and arrangement of parts may be made without departing from the spirit and scope of my invention, as claimed.

Having described the invention, I claim:

A device of the character set forth comprising an auxiliary steering post mounted at the non-driving side of an automobile, an auxiliary steering wheel secured to said post, a pulley secured to the auxiliary steering wheel, a hub mounted on the steering wheel of the automobile, a second pulley journaled on said hub, an endless element connecting said pulleys, and a spring catch carried by the hub for connecting and disconnecting the second pulley with said hub.

CLARENCE KLOCK.